Inventor:
William A. Ross
By Hofgren, Wegner,
Allen, Stellman & McCord
Attys

United States Patent Office 3,442,153

Patented May 6, 1969

1

2

3,442,153

HYDROSTATIC TRANSMISSION

William A. Ross, Rockford, Ill., assignor to Sundstrand Corporation, a corporation of Delaware Filed May 8, 1967, Ser. No. 636,818

Int. Cl. F16h *47/04*

U.S. Cl. 74—687 23 Claims

ABSTRACT OF THE DISCLOSURE

A hydraulic control for a transmission having plural power paths through a hydraulic drive and differential gearing, the control having a shift valve responsive to control fluid pressure indicating the displacement of one of the hydraulic units in the hydraulic drive for controlling clutches which select the power path through the transmission.

This invention relates generally to hydrostatic transmissions and more particularly to a control system for a multiple mode hydrostatic transmission.

Combined mechanical differential-hydrostatic transmissions, sometimes referred to as hydromechanical transmissions, have been proposed as vehicle transmissions for increasing efficiency and compactness over a basic strictly hydrostatic transmisison. One such differential-hydrostatic transmission is disclosed in my copending application Ser. No. 529,007, filed Feb. 21, 1966, now Patent No. 3,396,607. Basically, such transmission has selectively operable power paths in low and high speed ranges with shifting between the speed ranges being effected by clutch means in which the clutching elements are inherently substantially synchronous at a predetermined displacement of one of the hydraulic units in the transmission. An input shaft is drivingly connected to one of the hydraulic units and selectively connectable by a clutch to one of the gears in the differential; the other hydraulic unit (which operates as both a motor and a pump) is drivingly connected to the control gear in the differential, a second clutch being provided for locking the differential so that power in the lower speed range is delivered entirely by the hydrostatic components and when the second clutch is disengaged and the first clutch engaged in the upper speed range the power is delivered in split paths mechanically and hydrostatically.

In accordance with the present invention a control system is provided for a differential-hydrostatic transmission generally of the type described above. The control consists basically of an engine driven governor, including a fluid valve, which controls the displacement of one of the hydraulic units to control transmission ratio. A shift valve between the governor and the displacement control motor for one of the hydraulic units effects a reversal of the fluid connections between the governor valve and the displacement control motor when the associated hydraulic unit initially reaches maximum displacement causing a reversal of the displacement control motor so that it moves the variable displacement unit toward zero displacement. At the same time the shift valve reverses the fluid connections to the displacement control motor, it reverses the fluid connections to actuators for the clutches, thereby reversing the state of engagement of the clutches and changing the mode of the transmission from straight hydrostatic to differential-hydrostatic.

A neutral governor, driven by the transmission input shaft, and a zero pressure control valve control the transmission when the engine is in an engine idling speed range, e.g. below one thousnad r.p.m., and override the effect of the governor valve on the displacement control motor at this time to maintain the variable displacement unit at displacement to provide a zero pressure, no output torque condition, similar to placing a gear control in neutral in a conventional automobile. When activated by the neutral governor, the zero pressure control valve ports fluid in the main conduits interconnecting the hydraulic units to the respective sides of the displacement control motor so that any pressure rise in either of the main conduits is applied to the displacement control motor in a direction to oppose pressure buildup thereby to establish substantially equal pressure in the conduits, and thus go to a no output torque condition. This permits the engine to warm up at idling speeds without the control causing the transmission to place any load on the engine.

It is a primary object of the present invention to provide a new and improved hydrostatic transmission.

Another object of the present invention is to provide a new and improved hydraulic control circuit for a differential-hydrostatic transmission having plural modes of operation.

A further object of the present invention is to provide a new and improved control system for a differential-hydrostatic transmission of the type described above having two selectively operable clutches for effecting the shift from one mode to another and a pressure responsive shift valve for effecting actuation of the clutches in response to a rise in pressure in the displacement control motor for one of the hydraulic units caused when it arrives at its maximum stroke position.

A still further object of the present invention is to provide a new and improved hydraulic control circuit for a differential-hydrostatic transmission of the type described immediately above in which the shift valve also effects a reversal in the fluid flow conduits to the displacement control motor so that when it reaches one of its maximum displacement positions it will reverse and move in the opposite direction towards zero displacement. This reversal of the displacement control motor along with reversal of the state of the clutches changes the transmission from a straight hydrostatic mode to a differential-hydrostatic mode.

Another object of the present invention is to provide a new and improved control system for a differential-hydrostatic transmission of the type described above including a manual accelerator control to call for engine speed, and an engine driven governor valve biased by a signal from the operator's accelerator control, together operative in bringing the transmission up to speed from standstill, for increasing the displacement of the variable displacement hydraulic unit from zero to maximum in one direction to apply load on the engine for maintaining engine speed control as the vehicle speed increases in a low speed range, and operative in association with the shift valve, for reducing and reversing the displacement of the variable unit to maintain load on the engine as the vehicle speed increases in an upper speed range.

Still another object of the present invention is to provide a control of the type described above including a new and improved manually operable forward-reverse control valve for effecting either forward or reverse operation of the transmission.

A further object of the present invention is to provide a new and improved control system for a differential-hydrostatic transmission of the type described above having two fluid actuated clutches operable by movable shift pistons that act also as valves for depressurizing the control system during clutch actuation to achieve clutch synchronism.

Another object of the present invention is to provide a new and improved neutral governor valve arrangement for preventing the variable displacement unit from achieving a pressure rise or output torque at idling speeds and for depressurizing the control system during speed reduction to permit the associated vehicle to coast, rather than be dynamically braked by the transmission pressure.

Further objects and advantages will become apparent from the following detailed description taken in connection with the accompanying drawings in which.

Figure 1:
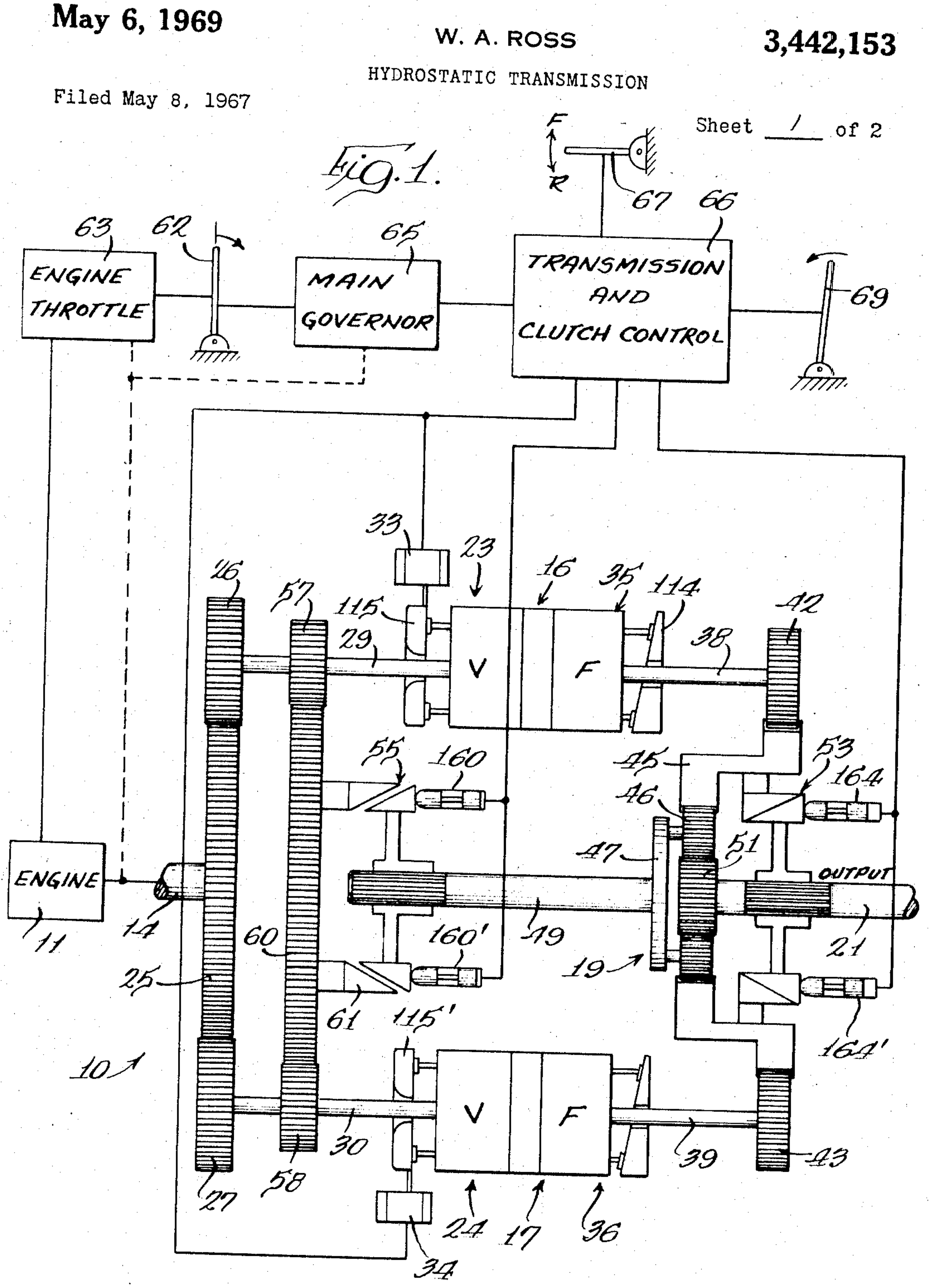
FIG. 1 is a schematic illustration of the present differential-hydrostatic transmission with the associated controls.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

*General arrangement*

Referring to the drawings, and particularly FIG. 1, a differential-hydrostatic transmission 10 is shown driven by a suitable prime mover 11. The transmission 10 is particularly suitable for on-highway vehicles where high efficiency and performance are required over a wide speed range, and is also suitable for use in hard working, slow moving, so called off-highway vehicles.

Transmission 10 generally includes an input shaft 14 driven by engine 11, hydraulic transmissions 16 and 17, gear differential 19 and output shaft 21.

The input shaft 14 is drivingly connected to variable displacement hydraulic units 23 and 24 in the hydraulic transmissions 16 and 17, respectively, through gear 25, gears 26 and 27 respectively, and shafts 29 and 30 respectively. The displacement of the variable displacement units 23 and 24 is controlled by displacement control motors 33 and 34 respectively. The transmissions 16 and 17 also include fixed displacement units 35 and 36 drivingly connected to shafts 38 and 39 respectively.

It should be understood that each of the hydraulic units 23 and 24, 35 and 36 is an axial piston hydraulic unit of well known configuration and those skilled in the art will readily appreciate the construction and operation so that a detailed description is not believed necessary.

The variable displacement hydraulic units 23 and 24 have cam members 115 and 115' each movable from zero displacement position to a first maximum displacement position on one side of zero and a second maximum displacement position on the other side of zero. Thus, reversible flow relative to the variable displacement hydraulic units is provided by movement of the cam members on either side of zero displacement which reverses the flow in the conduits (not shown in FIG. 1) interconnecting the variable displacement hydraulic units with the fixed displacement hydraulic units 35 and 36. In this manner, the direction and speed of rotation of the fixed hydraulic units 35 and 36 may be controlled.

As will appear hereinafter the hydraulic units are adapted to operate both as pumps and as motors depending upon the mode of the transmission selected.

Shafts 38 and 39 have gears 42 and 43 fixed thereto drivingly engaging external teeth on the ring gear 45 in the differential 19. Engaging internal teeth on ring gear 45 are a plurality of pinion gears 46 rotatably carried by a planetary gear carrier 47 fixed to shaft 49. A sun gear 51 meshes with the planetary pinions 46 and drives output shaft 21.

A first clutch 53 is provided for selectively connecting the ring gear 45 to the output shaft 21 in the low speed range of the transmission so that the differential 19 may be effectively locked and the power from the input shaft 14 to the output shaft 21 flows solely through the hydraulic transmissions 16 and 17. Clutch 53 is actuated by shift pistons or plungers 164 and 164', it being understood that any desired number of shift pistons may be provided.

A second clutch 55 is provided for selectively connecting the shaft 49 to be driven by input shaft 14. Toward this end gears 57 and 58 fixed to shafts 29 and 30 respectively, drivingly engage a large gear 60 carrying one of the clutch elements 61. Clutch 55 is actuated by shift pistons or plungers 160 and 160'. When clutch 55 is engaged and clutch 53 disengaged the transmission is placed in a differential-hydrostatic mode where power is delivered from the input shaft 14 to the output shaft 21 through both the hydraulic transmissions 16 and 17 and a mechanical power path through the clutch 55 and shaft 49.

A control system is provided for controlling the transmission 10 and the engine 11 so that the speed of the associated vehicle may be varied as desired. Toward this end, a control handle (or accelerator pedal) 62 is movable from a neutral position shown to program the throttle setting of an engine throttle 63 controlling the flow of fuel or air-fuel mixture to the engine 11. Control handle 62 also biases a main governor 65, driven by the engine 11, for controlling the speed ratio of the transmission 10 through a transmission and clutch control 66. As will be described in more detail below, a forward-reverse control handle 67 is provided for shifting a suitable valve in the transmission and clutch control 66 for selectively placing the transmission 10 in either a forward or reverse mode of operation. Further, a manual neutral lever 69 is provided for the transmission and the clutch control 66 which depressurizes the control system whenever desired by the operator regardless of the speed ratio otherwise selected.

When the engine 11 is running and the operator increases the engine throttle setting by moving control lever 62 above the idling speed range of the engine, the main governor 65, after an increase in engine speed, through the transmission and clutch control 66 begins increasing the displacement of the variable displacement hydraulic units 23 and 24, which then act as pumps supplying fluid to the hydraulic units 35 and 36 then acting as motors. Pistons 164 and 164' are in positions actuating clutch 53 and locking the differential 19. The shift pistons 160 and 160' are depressurized so that clutch 55 is disengaged. The engine speed then increases rapidly to a value dictated by the handle 62. The transmission is then in a low speed straight hydrostatic mode where the hydraulic units 23 and 24, acting as pumps, drive the units 35 and 36 in the same direction of rotation. Motors 35 and 36 drive the output shaft 21 through gears 42 and 43 respectively and differential 19, applying a load to the engine to maintain the engine speed at the value selected.

The main governor 65 in conjunction with the transmission control 66 controls the transmission ratio in a manner to maintain the selected engine speed so that if the engine speed is below that called for the transmission ratio (transmission output speed vs. transmission input speed) will be reduced (i.e. transmission output speed reduced with respect to transmission input speed) to let the engine gain speed and if the engine speeds above that called for the ratio will be increased to reapply the load. In this mode, the speed of shaft 21 is controlled by the displacement of the hydraulic units 23 and 24 and the speed of the engine without varying the ratio in the mechanical differential.

The transmission will stay in this low speed straight hydrostatic mode until the variable displacement units 23 and 24 move to their maximum displacement positions which occurs if the engine speed still tends to increase above that dictated by the setting of handle 62, or if the speed ratio required to maintain the dictated engine speed is greater than can be achieved in the hydrostatic mode. When hydraulic units 23 and 24 reach maximum displacement the transmission and clutch control 66 depressurizes the shift pistons 164 and 164', disengaging clutch 53, and pressurizes shift pistons 160 and 160', engaging clutch 55. This connects the input shaft 14 to drive shaft 49 and frees the differential 19. The gearing is selected with respect to the displacement of the hydraulic units so that when the variable displacement units 23 and 24 are in their maximum displacement positions gear 60 and clutch element 61 will rotate at substantially the same speed as the power shaft 49 to achieve synchronous clutching, providing a smooth shift from the straight hydrostatic mode to the split differential mode. Since the displacement of units 23 and 24 is proportional to transmission ratio in the low speed range, shifting occurs at a predetermined transmission ratio.

Thereafter, if the engine speed still tends to increase above the desired level, the main governor 65 and the transmission and clutch control 66 will cause a reduction in the displacement of the hydraulic units 23 and 24 which then begin to act as motors or metering devices for the fixed displacement units 35 and 36 respectively which then act as pumps driven by gears 42 and 43 respectively.

With clutch 55 engaged and clutch 53 disengaged, the gear carrier 47 and the ring gear 45 rotate in the same direction so that the ring gear effectively subtracts speed from the differential as compared to the output speed when the ring gear is stationary. This occurs in the first part of the differential mode. As the displacement of the hydraulic units 23 and 24 is further reduced toward neutral, they provide a greater restriction to flow, and the speed of the hydraulic units 35 and 36 decreases, thereby subtracting less and less speed from the differential 19 permitting the output speed of shaft 21 to increase further. During this mode the speed of the hydraulic units 35 and 36 and the stroke of units 23 and 24 decrease toward zero.

In response to a continuing tendency for the engine speed to increase above that dictated by the throttle setting, governor 65 and transmission and clutch control 66 will cause the variable unit cams 115 and 115' to reach their zero displacement positions and then reverse so that the fixed displacement units 35 and 36 will cease rotation inasmuch as the variable units 23 and 24 pass through zero displacement, thereby stopping rotation of the ring gear 45. The variable units 23 and 24 then act as pumps with the cams 115 and 115' moving on the other side of neutral, driving units 35 and 36 again as motors but in a reverse direction. This causes ring gear 45 in the differential to reverse its direction of rotation so that it begins rotation opposite from the planet carrier 47 thereby adding speed to the differential and further increasing speed of output shaft 21. The speed of the transmission can then be increased in this mode until the maximum speed is obtained when the displacement of the hydraulic units 23 and 24 is full or maximum negative.

In bringing the output shaft 21 up to speed, the hydraulic units 35 and 36 are effectively used three times as they go through their speed range three times while the associated output shaft goes through its speed range once.

After the engine 11 reaches the speed dictated by the control lever 62, the main governor 65 and the transmission and clutch control 66 will assume an equilibrium position. The speed of the transmission may thereafter be decreased by shifting the control lever 62 back towards its neutral position shown in FIG. 1. The reduced throttle setting will cause the transmission to temporarily load the engine 11 and thereby effect a decrease in engine speed. That is, the reduced throttle setting causes the governor 65 and the transmission control 66 to increase system pressure by movement of cams 115 and 115' resulting in an increase in load on the engine by the transmission driving the engine speed down to the new lower level. As the engine speed falls slightly below the new value the governor 65 and the transmission control 66 will begin reducing the transmission ratio by reducing the displacement of the hydraulic units 23 and 24 (thus reducing transmission ratio in the upper portion of the differential hydrostatic mode) from their negative positions toward neutral and then again increase displacement on the other side of neutral if necessary.

If the load on the engine by the transmission is still greater than required to maintain engine speed at the reduced level the main governor and transmission control will place the hydraulic units 23 and 24 approximately in maximum positive displacement (further reducing transmission ratio) and in response to this transmission ratio the transmission and clutch control disengages clutch 55 and engages clutch 53 placing the transmission again in the straight hydrostatic mode. At the same time the displacement cams 115 and 115' are reversed moving them again toward neutral as required to remove the load from the engine to maintain the desired engine speed.

The reverse drive of the transmission is effected by moving the control handle 67 to the reverse position causing the transmission and clutch control 66, under the influence of the main governor 65, to move the cam members 115 and 115' toward their maximum reverse positions in the straight hydrostatic mode. This permits about twenty percent of the maximum transmission speed to be obtained in reverse. No reversing gears or clutch actuations are necessary to place the transmission in reverse as it operates in the straight hydrostatic mode in the same manner as the low speed forward hydrostatic mode.

*Control circuit*

Figure 2:
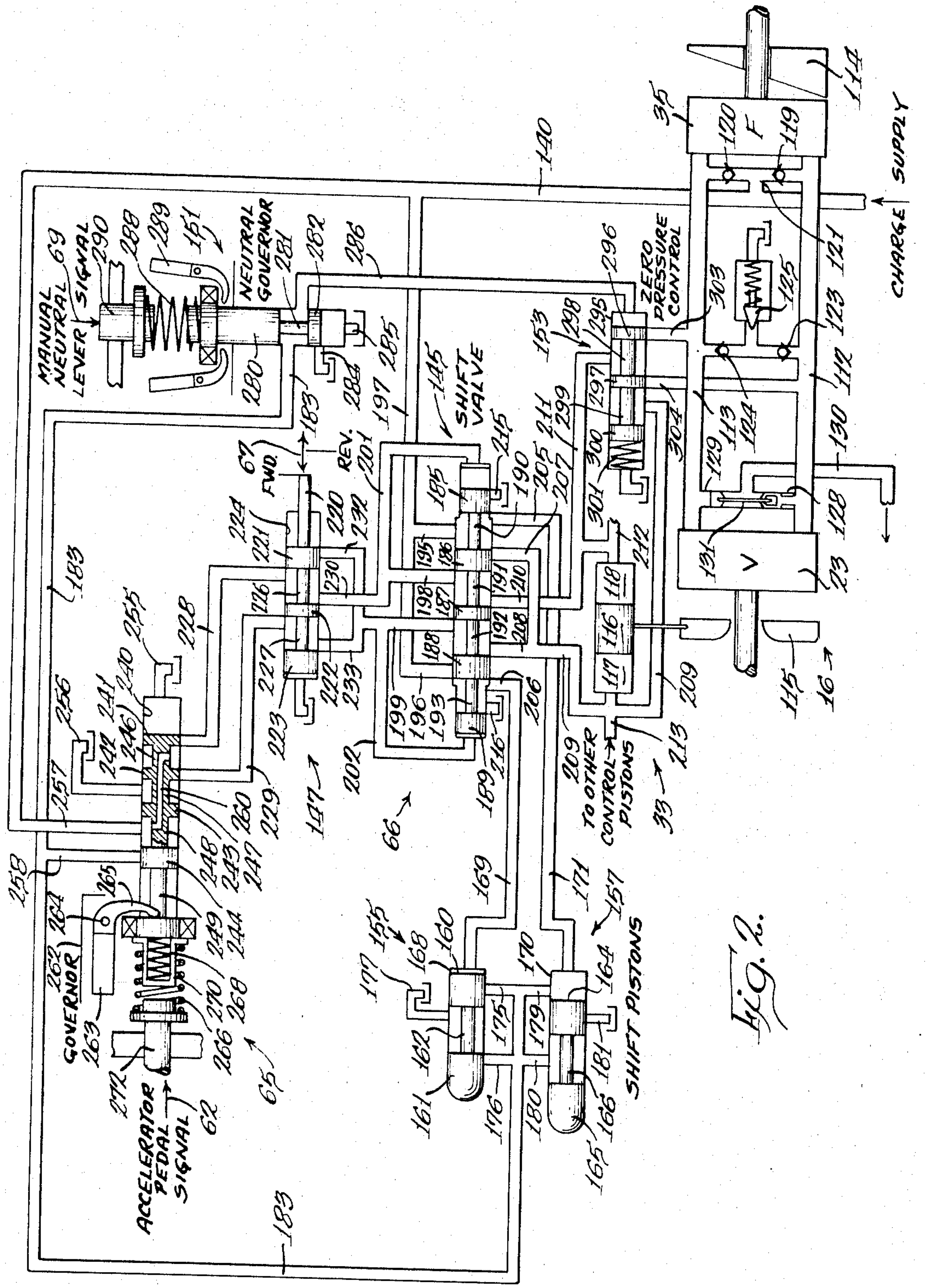
FIG. 2 is a hydraulic circuit shown only generally in FIG. 1 for controlling the displacement of the hydraulic units and the mode changing clutches.

Turning now to FIG. 2 for a more detailed description of the present hydraulic control circuit, including the main governor 65, the transmission and clutch control 66, the clutch actuation plungers 160 and 164, and one of the hydraulic transmissions 16, 17. It should be understood that the other hydraulic transmission 17, the mechanical gearing, the clutches and other components have been eliminated in FIG. 2 for clarity. Two hydraulic transmissions 16, 17 are preferred for purposes of carrying the desired load in the particular embodiment illustrated, while utilizing available hydraulic units and taking into account that a significant weight reduction is obtained by utilizing two small hydraulic transmissions as compared to a single large hydraulic transmission capable of carrying the intended load.

In the control circuit, the hydraulic transmission illustrated at 16 includes the variable displacement axial piston hydraulic unit 23 and the fixed displacement axial piston hydraulic unit 35 connected in close hydraulic circuit by means of conduits 112 and 113 adapted to function as connections leading from the outlet of the unit functioning as a pump to the inlet of the unit functioning as a motor and leading from the motor outlet to the pump inlet. The fixed unit 35 includes a fixed cam or swashplate 114 while the variable unit includes a variable cam or swashplate 115 movable in opposite directions from a zero displacement position illustrated under control of a double acting piston 116 in a control motor 33 having opposed chambers 117 and 118.

The closed hydraulic circuit interconnecting the hydraulic units 23 and 35 operates under varying conditions in which the conduit 112 is sometimes the high pressure conduit and the conduit 113 is sometimes the low pressure conduit while at other times the conduit 113 is at high pressure and the conduit 112 is at low pressure. In order to admit charge fluid to the circuit under either condition of operation, for purposes of makeup for leakage and lubricating fluid withdrawn, inlet check valves 119 and 120 communicate respectively with the conduits 112 and 113 and with a source 121 of charge fluid common to both inlet valves. It will be understood that high pressure in either of the conduits 112 or 113 will maintain the associated inlet check valve 119 or 120 closed while the other inlet valve is free to open to admit makeup fluid to the circuit.

In order to relieve the circuit of excessive high pressure regardless of which of the conduits 112 and 113 is pressurized, relief check valves 123 and 124 communicate respectively with the conduits 112 and 113 and also communicate with a common relief valve 125.

To withdraw heated fluid from the closed hydraulic circuit between the hydraulic units 23 and 35, passages 128 and 129 lead respectively from the main conduits 112 and 113 to a passage 130, the latter of which is selectively placed in communication with one of the former under control of a shuttle valve 131 having opposite ends respectively exposed to the fluid in conduits 112 and 113 so that high pressure in one of the conduit shifts the shuttle valve to a position withdrawing heated fluid from the low pressure conduit for supply to a cooling loop and then return to the charge circuit.

It will be understood that the hydraulic unit 17 is similar to unit 16 described above. Valves 119, 120, 123, 124, 125 and 131 are common to the hydraulic circuit of both units.

In order to bring the vehicle up to speed as described above, the swashplate 115 associated with the variable unit 23 is first moved from zero displacement in a direction toward maximum stroke at one extreme, while the hydrostatic transmission is operated in the pure hydrostatic mode, with the clutch 53 engaged and the clutch 55 disengaged. The swashplate 115′ associated with unit 24 moves in the identical manner but, as noted above, is not referred to with respect to FIG. 2 for brevity. When the variable unit reaches maximum stroke, the shift in the transmission from pure hydrostatic to a combined hydrostatic and mechanical operation is effected by disengaging clutch 53 and engaging clutch 55.

Thereafter, the variable unit cam 115 is moved back toward the zero displacement position and from zero toward maximum angle in the opposite direction.

With reference to the control piston 116 for the variable unit 23, transmission operation is initiated by pressurizing the chamber 117 to move the variable unit cam to full stroke in one direction. After the shift in mode, the chamber 118 is pressurized to move the variable angle cam back toward neutral and toward maximum angle in the opposite direction.

In order to control the movement of control piston 116 and the clutches 53 and 55 as described above, the main governor 65 and the transmission and clutch control 66 make use of a number of valves which regulate the flow of control fluid under pressure from a source represented at 140 to the chambers 117 and 118 and to clutch shift pistons 160 and 164. These include a pressure-operated shift valve 145 which effects the transition from the straight hydrostatic mode to the combined hydrostatic and mechanical mode, a forward-reverse valve 147 (operable by lever 67) for controlling the direction of transmission operation, a manually operable and speed operable main governor valve 65 (biased by manual lever 62), a manually operable and speed operable neutral governor valve 151 (biased by manual lever 69), a pressure-operated zero pressure control valve 153, a pressure-operated clutch valve 155 associated with piston 160 for operating clutch 55, and a pressure-operated clutch valve 157 associated with piston 164 for operating clutch 53.

Each of the clutches 53 and 55 is operated by a plurality of pistons, as many as desired, with one of these in each set being constructed to operate additionally as a valve member respectively as shown in the valves 155 and 157. More particularly, valve 155 includes plunger 160 having one end 161 adapted to engage and shift a clutch member in clutch 55 together with a central reduced portion 162 between opposed enlarged ends. Similarly, in valve 157, the valve plunger 164 includes end portion 165 adapted to engage and shift a clutch member in clutch 53, together with a reduced central portion 166 between opposed enlarged end portions. The plunger 160 reciprocates in a chamber 168 communicating with a passage 169 to which fluid under pressure may be supplied for shifting the plunger 160 to the left from the position shown in the circuit diagram. Passage 169 communicates with shift valve 145. On decay of pressure in the passage 169, the plunger 160 may be returned to the right by virtue of spring pressure in clutch 55 tending to separate the clutch members. Plunger 164 reciprocates in a chamber 170 communicating with a passage 171 adapted to supply fluid under pressure for shifting the plunger toward the left to the position shown to engage clutch 53. Passage 171 communicates with shift valve 145. In the absence of pressure in the passage 171, the plunger 164 may be shifted to the right by the force of spring means in clutch 53 tending the separate the clutch members.

The valving function of the plungers 160 and 164 may be explained as follows. When the plunger 160 is disposed in the rightmost position as illustrated, the enlarged right end of the plunger blocks communication between the passage 169 and a passage 175, and the enlarged left end of the plunger blocks communication between a passage 176 and a drain 177. Similarly, when the plunger 164 is disposed in its rightmost position, the enlarged right end blocks communication between passage 171 and a passage 179, while the enlarged left end blocks communication betwen a passage 180 and a drain 181. The branch passages 175, 176, 179 and 180 communicate with a conduit 183 which in turn communicates with the main governor valve 65 and the neutral governor valve 151.

On initial movement of the plunger 160 from the rightmost position toward the left, branch passage 176 is placed in communication with drain 177 to momentarily depressurize the system to permit synchronization of the clutch parts of clutch 55 and full clutch engagement. The system is depressurized until clutch engagement is complete. On completion of movement of the plunger 160 to its leftmost position, passage 169 is placed in communication with passage 175 through the chamber 168, and communication between the branch passage 176 and the drain 177 is blocked by the enlarged right end of the plunger. Similarly, on initial movement of plunger 164 toward the left, branch passage 180 is placed in communication with drain 181 to depressurize the system momentarily for synchronization of the clutch parts in clutch 53 and full clutch engagement. When the plunger 164 attains its leftmost position as illustrated, passage 171 communicates with passage 179, and the enlarged right end of the plunger blocks communication between branch passage 180 and drain 181. It will be appreciated that the plunger 160 and 164 are alternately operable to engage either clutch 55 or clutch 53. Accordingly, the passage 169 and 171 are alternately one pressurized and the other connected to drain.

Shift valve 145 is adapted to control the clutch plungers 160 and 164 and to control the displacement varying piston 116 of the variable unit 23, the latter by controlling the supply of fluid to the chambers 117 and 118. The shift valve includes a valve plunger having valve lands 185, 186, 187, 188 and 189 with intervening reduced stem portions 190, 191, 192 and 193. The valve plunger is reciprocable in a valve bore having ports 195 and 196 communicating with a passage 197 leading from the charge pressure passage 140. The valve bore also communicates with passages 198 and 199 leading from the forward-reverse valve 147. Branches 201 and 202 lead respectively to opposite ends of the valve plunger. The valve bore communicates with passages 205 and 206 leading respectively to chambers 170 and 168 for the clutch plungers. Ports 207 and 208 from the valve bore communicate with a common passage 209 leading to displacement varying chamber 117, while port 210 communicates with displacement varying chamber 118. A branch passage 211 leads to zero pressure control valve 153. Branches 212 and 213 are adapted respective to communicate chambers 118 and 117 with corresponding chambers in the other hydraulic transmission 17. Finally, drain ports 215 and 216 communicate respectively with opposite ends of the bore.

In operation, the shift valve plunger is adapted to move back and forth in the valve bore from a leftmost position as illustrated to a rightmost position where the piston or land portion 185 "bottoms out" in the right end of the valve bore.

When the shift valve plunger is positioned as shown, it is effective to initiate transmission operation in the straight hydrostatic mode, with the clutch 53 engaged, the clutch 55 disengaged, and the displacement varying chamber 117 pressurized. Under such circumstances, control fluid under pressure is supplied through the passage 199, the reduced stem portion 192, the port 208 and the passage 209 to the chamber 117 to put the variable unit in stroke. At the same time, control fluid under pressure is supplied from the charge passage 140, through the passage 197, the port 195, the reduced stem portion 190, the port 205 and the passage 171 to pressurize the chamber 170 to engage clutch 53. At this time, valve land 188 blocks communication between charge port 196 and drain port 216, and valve land 185 blocks communication between charge port 195 and drain port 215. Valve land 186 blocks communication between ports 195 and 207, and it also blocks communication between ports 198 and 207, while valve land 187 blocks communication between ports 199 and 210. Reduced stem portion 191 communicates ports 198 and 210. Reduced stem portion 193 connects passage 196 and port 206 to drain 216 so that clutch 55 is disengaged. The pressure of fluid in port 199 is applied through passage 202 to the left end of the valve plunger land 189, and the right end of valve plunger land 185 communicates with passage 201.

When the main governor valve 65 is in the position shown it modulates, alternately connecting the displacement varying chambers 117 and 118 between pressure and drain.

The shift valve plunger is held in the leftmost position by the pressure of charge fluid in port 195 acting against the right-hand side of valve land 186. While such fluid also acts oppositely against the left end of valve land 185, the latter is smaller in diameter than the land 186, and the force of the fluid against the larger end area of land 186 produces the desired effect.

At the same time, it will be noted that fluid under pressure in the passage 202 acts against the left end of valve plunger land 189. However, the pressure of such fluid is lower than that acting through the port 195 because of the pressure reduction occurring in the supply of charge fluid across the main governor valve 65, and such reduced pressure together with the sizing of the land 189 is normally insufficient to overcome the pressure of fluid acting against land 186 until such time as the valve plunger is shifted toward the right as explained presently.

Shifting of the shift valve plunger to the right may be explained as follows. When the displacement varying piston 116 reaches the end of its stroke, the pressure of control fluid in the chamber 117 rises to the place where there is effectively no pressure drop across the main governor valve and the pressure of fluid acting through the passage 202 against the left end of plunger land 189 increases and is substantially equal to that acting directly through the port 195 against valve land 186 which has decreased. Such rise in pressure against land 189 and drop in pressure against land 186 shifts the valve plunger in push-pull fashion to the rightmost position.

In the rightmost position, land 189 blocks communication between clutch port 206 and drain port 216, and reduced stem portion 193 communicates port 196 with port 206 to apply the pressure of charge fluid to the clutch plunger 160 and engage clutch 55. Valve land 186 blocks port 195 from clutch port 205 and reduced stem portion 190 communicates clutch port 205 with drain port 215 so that clutch plunger 164 is depressurized and clutch 53 is disengaged.

At the same time, valve land 188 blocks communication between pressure port 199 and port 208 leading to displacement varying chamber 117, and reduced stem portion 191 communicates port 207 with port 198 in turn connected to the main governor. Reduced stem portion 192 communicates port 199 (communicating with the main governor) with port 210 leading to the displacement varying chamber 118.

When the shift valve plunger is in the rightmost position, the pressure of charge fluid in port 196 acting against the left side of valve land 188 assists in holding the plunger in such position.

It will be understood from the description above that when the shift valve plunger occupies the leftmost position, the clutch plunger 164 is pressurized and the displacement varying chamber 117 is pressurized to put the transmission into operation in the straight hydrostatic mode. Assuming the main governor valve calls for a transmission ratio greater than that attainable in the "low gear" hydrostatic mode (to control the engine), when the displacement varying piston 116 reaches the end of its stroke, the shift valve plunger is moved to its rightmost position, exhausting clutch plunger 164 and displacement varying chamber 117 while pressurizing clutch plunger 160 and displacement varying chamber 118. The consequent disengagement of clutch 53 and the engagement of clutch 55 effects a shift in the mode to combined hydrostatic and mechanical operation and the movement of the displacement varying means is reversed to increase the transmission output speed in the combined hydrostatic and mechanical mode of operation.

When the main governor valve 65 calls for a reduction in the ratio of the transmission, the valve 65 will reverse the pressure conditions in ports 199 and 198 so that the former is exhausted and the latter is pressurized. Under these conditions, the clutches remain as they were, the plunger 160 being pressurized and the plunger 164 exhausted as described above. However, pressure is now supplied to displacement varying chamber 117 while the chamber 118 is exhausted so that the displacement varying means begins to move backwardly through its previous stages of operation. Chamber 117 is pressurized through port 198, reduced stem portion 191, port 207 and passage 209. Chamber 118 is exhausted through port 210, reduced stem portion 192 and port 199. At this time, the port 199 is connected to drain through the forward-reverse valve 147 and a drain port 256 illustrated at the top of the main governor valve.

Continuing, when the displacement varying piston 116 reaches the end of its stroke at the rightmost position, the pressure of fluid in the port 201 begins to rise until such time as there is no longer a pressure drop across the main governor valve and the pressure acting against the right end of plunger land 185 increases to where it equals that acting against the left end of land 188, which has decreased. However, the size of the land 185 is such that these conditions effect a shift of the plunger back to the leftmost position.

Now, the pressure conditions in the chambers 117 and 118 are reversed and the pressure conditions in the clutch chambers 168 and 170 are also reversed, returning the transmission to its straight hydrostatic mode. Specifically, chamber 118 is pressurized through port 210, reduced stem portion 191 and port 198, while chamber 117 is exhausted through passage 209, port 208, reduced stem portion 192 and port 199 moving pump cam 115 and reducing the transmission output speed. Clutch plunger 164 is pressurized through passage 171, port 205, reduced stem portion 190 and port 195, while clutch plunger 160 is exhausted through passage 169, port 206, reduced stem portion 193 and drain port 216.

The manner in which the transmission is started and stopped will be explained presently.

Referring now to the forward-reverse valve 147, it includes a manually shiftable (by lever 67) valve plunger 220 including spaced valve lands 221, 222 and 223 in a valve bore 224. Between the lands are reduced stem portions 226 and 227. Ports 228 and 229 communicate the bore 224 with the main governor valve 65. Port 230 communicates the bore 224 with port 198 and passage 201 leading to the shift valve. Ports 232 and 233 communicate the bore 224 with port 199 and passage 202 leading to the shift valve.

In operation, the forward-reverse valve plunger 220 is manually movable to a leftmost position as illustrated for forward operation of the transmission. In such position, it will be seen that port 229 communicates through reduced stem portion 227 with port 233 while port 228 communicates through reduced stem portion 226 with port 230.

In order to obtain reverse operation of the transmission, the valve plunger 220 is movable to a rightmost position where valve land 223 blocks communication between ports 229 and 233 and valve land 222 blocks communication between ports 228 and 230. At the same time, port 229 communicates through reduced stem portion 227 with port 230, and port 228 communicates through reduced stem portion 226 with port 232, so that the pressure conditions in ports 228 and 229 are applied reversely to the shift valve as compared to the situation where the forward-reverse valve plunger occupies the leftmost position.

It will be understood that in order to obtain reverse operation of the transmission, operation of the hydraulic transmission is initiated by moving the displacement varying piston from the zero displacement position illustrated toward the left rather than toward the right as in forward operation. Further, it will be recalled that in reverse operation of the transmission, only the straight hydrostatic mode is used and there is no shift from that mode to the combined hydrostatic and mechanical operation.

To the end referred to immediately above, with the forward-reverse valve plunger 220 in the rightmost reverse position, and the shift valve plunger in the leftmost position illustrated, clutch plunger 164 is pressurized through the path previously described and clutch plunger 160 is exhausted through the path previously described. At the same time, control pressure delivered through the main governor valve to the port 229 is supplied to the displacement varying chamber 118 through reduced stem portion 227, port 230, port 198, reduced stem portion 191 and port 210, while the chamber 117 is exhausted through passage 209, port 208, reduced stem portion 192, port 199, port 232, reduced stem portion 226, port 228 and a drain port 255 at the right end of the main governor valve.

In the reverse mode, the pressure of fluid acting through port 195 against the right side of land 186 is assisted by the pressure fluid acting through passage 201 against the right end of plunger land 185 so that when the displacement varying piston reaches the end of its stroke, there is no tendency to shift the shift valve plunger as in forward operation, bearing in mind that the passage 202 communicating with the left end of plunger land 189 is effectively connected to drain.

Referring now to the main governor valve 65, it consists of a valve bore 240 reciprocably housing a valve plunger including lands 241, 242, 243 and 244 together with adjacent reduced stem portions 246, 247, 248 and 249. The valve bore 240 communicates with drain ports 255 and 256, pressure ports 257 and 258, and with ports 228 and 229 leading to the forward-reverse valve. The valve plunger includes an internal passage 260 communicating at opposite ends with reduced stem portions 248 and 246.

In operation, the governor valve sleeve rotates in a conventional manner with a head 262 driven by suitable gearing connected with the vehicle engine and carrying flyweights 263 pivoted on the head as at 264. The flyweights include extension arms as at 265 which tend to move the valve plunger toward the left with increasing speed, in opposition to a main spring 266 which tends to urge the valve plunger toward the right. At very low speeds or when the device is not operating, a smaller spring 268 acts against the main spring seat 270 to urge the valve plunger toward the right when the main spring is fully extended. The main spring is compressible by means of a manually controllable plunger 272 which acts against the main spring 266.

The plunger 272 is connected through suitable linkage with the engine accelerator pedal or lever 62 which is manually operable to simultaneously adjust fuel flow or throttle opening and governor spring pressure. In response to the operator's movement of lever 62 to increase throttle opening the governor spring pressure also increases so that transmission ratio is changed to permit the engine speed to increase to the desired value. After the desired engine speed is attained the governor will vary transmission ratio to increase the load applied to the engine, tending to maintain the desired engine speed until the flyweight pressure against the spring 266 increases to equilibrium when the desired power level exists.

Excepting initial starting and final stopping, the operation of the governor valve may be explained as follows. Depression of the accelerator pedal 62 calls for an increase in engine speed by increasing governor spring bias and increasing the throttle opening. The resulting initial movement of valve 65 to right pressurizes port 228 and connects port 229 to drain. Regardless of the position of shift valve 145 this will cause an increase in pressure in the one of the chambers 117 or 118 tending to move cam 115 to reduce system pressure between units 23 and 35. In the straight hydrostatic mode the pressure in chamber 118 would be increased reducing the displacement of unit 23 then acting as a pump thereby reducing transmission ratio i.e. reducing transmission output speed with respect to transmission input speed. In the lower part of the differential hydrostatic mode the pressure in chamber 117 would be increased increasing the displacement of unit 23 then acting as a motor thereby reducing transmission ratio. And if the transmission were operating in the upper part of the differential hydrostatic mode the pressure in chamber 118 would be increased reducing the displacement of unit 23 then acting as a pump thereby reducing transmission ratio. This reduction in transmission ratio reduces the torque load on the engine allowing engine speed to increase. When engine speed reaches the preselected value the flyweights move the valve plunger to the left from the position illustrated so that charge fluid is supplied through the port 257, the reduced stem portion 248, the internal passage 260 and the reduced stem portion 246 to the pressure port 229, while the port 228 is communicated with drain port 255 past the right end of the valve plunger. Now, regardless of the position of shift valve 145 this increases the load on the engine by increasing transmission ratio to maintain the new engine speed. As explained above, the supply of control fluid under pressure to the port 229 calls for increased transmission ratio at the displacement varying chambers through the appropriate passages of the forward-reverse valve 147 and the shift valve 145. So long as the speed of the engine positions the valve plunger to call for increased transmission ratio, the reduced stem portion 246 will communicate with the pressure port 229, calling for increased ratio at the displacement varying chambers. If adjustment of the transmission ratio tends to load the engine above that required to maintain the new engine speed then the engine will tend to slow down, reducing the effect of the flyweights so that the spring 266 moves the valve plunger toward the right from the position illustrated, where the pressure port 229 is connected to drain port 256 through reduced stem portion 247, and the passage 228 is pressurized by the control fluid from the internal passage 260. This tends to reverse the adjustment of the transmission ratio and remove a portion of the load from the engine, so that the transmission ratio is stabilized with the valve plunger land 242 modulating relative to the ports 229 and 228 as shown in FIG. 2.

Neutral governor 151 includes a valve plunger 280 having a reduced stem portion 281 and an end land 282. The plunger 280 is movable in a valve bore having a port communicating with passage 183, drain ports 284 and 285, and a port leading to a passage 286 communicating with the zero pressure control valve 153. The plunger 280 is urged in a downward direction by a spring 288 and is movable upwardly under control of a governor head driven by the engine and including flyweights 289. Spring 288 bears against a manually adjustable plunger 290, movable by manual lever 69, which enables selective use of the neutral governor.

In operation, the neutral governor valve is utilized to prevent application of the load of the transmission on the engine at engine idle speed, for example, for the purpose of warming the engine up when it is first started in the morning. By use of the manually operable spring seat plunger 290, the neutral governor valve may be utilized to depressurize the transmission control system at any time. More specifically, when the plunger 290 is positioned as illustrated, the spring 288 is effective to maintain the valve plunger in a lowermost position (not illustrated) where the enlarged upper end of the plunger blocks communication between passage 183 and passage 286 while the reduced stem portion 281 communicates passage 286 and drain port 284. As will be described presently in connection with the zero pressure control valve, such positioning of the valve plunger has the effect of depressurizing the control system to prevent transmission operation. Such condition may, for example, exist with engine idle speeds on the order of 500 r.p.m. On the other hand, if the engine accelerator is depressed to call for transmission operation, at about 1000 r.p.m. the flyweights 289 are effective to overcome the force of spring 288 to move the plunger 280 upwardly to the position illustrated where the reduced stem portion 281 communicates the passage 183 and the passage 286 while the land 282 blocks communication between the passage 286 and the drain port 284. Under these conditions, control fluid under pressure is supplied from the passage 183 to the passage 286 and the zero pressure control valve which has the effect of enabling transmission operation as described below.

At any time desired by the operator, the transmission may be neutralized by depression of the spring seat plunger 290 by lever 69 to maintain the valve plunger 280 in the lowermost position even though the speed of the engine exceeds 1000 r.p.m.

Referring now to the zero pressure control valve 153, it includes a valve bore 295 in which there is a valve plunger including valve lands 296, 297 and 300 with adjacent reduced stem portions 298 and 299. The valve plunger is urged to the right in the valve bore by a spring 301 and is movable leftward to the position illustrated by pressure in the passage 286.

Valve bore 295 communicates with passages 211 and 209 and includes ports 303 and 304 communicating respectively with the main hydraulic conduits 113 and 112.

When the neutral governor valve plunger 280 connects the passage 286 to drain port 284, the force of spring 301 shifts the valve plunger to the right, where port 303 communicates with passage 211 through reduced stem portion 298, while port 304 communicates with passage 209 through reduced stem portion 299. When the passage 286 is pressurized, the zero pressure control valve plunger is positioned as illustrated, blocking ports 303 and 304.

To explain the operation of the zero pressure control valve 153, reference is again made to the operation of the main governor valve 65 as follows. When the vehicle engine is not operating, the springs 266 and 268 move the governor valve plunger to its rightmost position, but after the engine is started and attains engine idle speed, the rotating flyweights 263 move the governor valve plunger to the position illustrated. Thereafter, on initiating operation of the transmission by depression of the accelerator pedal, the plunger 272 drives the spring 266 which in turn moves the governor valve plunger to the right temporarily before the consequent increase in engine speed has the effect of throwing the flyweights outwardly to move the plunger to the left from the position illustrated. A similar movement of the valve plunger to the right from the position illustrated occurs if the transmission is in operation at a predetermined speed less than full and depression of the accelerator calls for a substantial increase in speed. In the last situation, the temporary plunger movement to the right has the effect of porting control fluid to the port 228 rather than the port 229, giving a temporary "no-go" signal which provides a temporary period in which the engine is unloaded to accelerate to the increased speed called for. When the increased speed is attained, the flyweights move the valve to the left of the position illustrated which calls for the increased transmission ratio desired.

During the temporary movement of the main governor valve plunger to the right on initiation of transmission operation from a standstill, between the idle speed of 500 r.p.m., for example, and the engine speed of 1000 r.p.m., when the neutral governor valve shifts, the latter is positioned to port the passage 286 to drain 284, so that the zero pressure control valve plunger is in its rightmost position communicating port 303 with passage 211 and communicating port 304 with passage 209. In this event, the temporary movement of the main governor valve plunger to the right, porting control fluid to port 228 rather than 229, may have the effect of pressurizing displacement varying chamber 118, rather than 117, causing movement of displacement varying piston 116 in the wrong direction. Such a condition is prevented since any pressure build up in either conduit 112 or 113 has the effect of positioning the displacement varying piston 116 to keep the pressures in the conduits 112 and 113 substantially equal. In this manner the zero pressure control valve overrides the operation of the main governor until such time as the engine and hence the neutral governor reach normal operating conditions.

On decelerating the transmission to a standstill the zero pressure control valve in conjunction with the neutral governor will function in a similar manner. When the engine speed drops to below 1000 r.p.m. the neutral governor valve drops, blocking port 183 from 286 and connecting passage 286 through reduced stem 281 with drain 284. This has the effect of positioning the zero pressure control valve plunger in its rightmost position communicating port 303 through reduced stem 298 with passage 211 and port 304 through reduced stem 299 with passage 209. This causes the displacement varying piston 116 to seek a position to keep the pressures in conduits 112 and 113 the same and the transmission coasts to a standstill in an unpressurized mode.

The main governor valve 65 includes a fail-safe provision such that if for some reason the drive to the flyweight head is incapacitated, the valve plunger is returned toward the right by the springs 266 and 268 in the absence of opposition by the flyweights 263. Spring 268 assures movement of land 244 past port 258 connecting port 258 through reduced stem 249 with the interior of the casing (which is connected to drain). This results in loss of pressure acting on the zero pressure valve plunger and it moves to its rightmost position depressurizing the transmission in the manner described above. Some adjustment of the resistance of passage 183 upstream of port 258 is necessary to conserve charge pressure to the remainder of the circuit in this condition.

I claim:

1. A hydrostatic transmission, comprising: a first hydraulic unit, a second hydraulic unit, conduit means interconnecting the first and second hydraulic units, fluid operable means for varying the displacement of one of said hydraulic units from neutral, means for changing the mode of the transmission including means for selectively operating one of said units as either a pump or a motor, said fluid operable means being sequentially movable from a first displacement position to a second displacement position other than neutral and from said second displacement position toward said first displacement position in bring the transmission up to speed, and shift valve means for controlling the flow of fluid relative to said fluid operable means, said shift valve means being responsive to fluid pressure in said fluid operable means for reversing the direction of movement of said fluid operable means at said second displacement position.

2. A hydrostatic transmission comprising: a first hydraulic unit, a second hydraulic unit, conduit means interconnecting the first and second hydraulic units, fluid operable means for varying the displacement of one of said hydraulic units, means for changing the mode of the transmission including means for selectively operating one of said units as either a pump or a motor, said fluid operable means being sequentially movable from a first displacement position to a second displacement position and from said second displacement position toward said first displacement position in bringing the transmission up to speed, shift valve means for controlling the flow of fluid relative to said fluid operable means, said shift valve means being responsive to fluid pressure in said fluid operable means for reversing the direction of movement of said fluid operable means, a differential gear mechanism having an input gear, an output gear and a control gear, an input shaft, and an output shaft, one of said hydraulic units being drivingly connected to one of said shafts, the other of said hydraulic units being drivingly connected to said control gear, one of said shafts being drivingly connected to one of said input and output gears, the other of said shafts being drivingly connected to the other of said input and output gears.

3. A hydrostatic transmission comprising: a first hydraulic unit, a second hydraulic unit, conduit means interconnecting the first and second hydraulic units, fluid operable means for varying the displacement of one of said hydraulic units, means for changing the mode of the transmission including means for selectively operating one of said units as either a pump or a motor, said fluid operable means being sequentially movable from a first displacement position to a second displacement position and from said second displacement position toward said first displacement position in bringing the transmission up to speed, shift valve means for controlling the flow of fluid relative to said fluid operable means, said shift valve means being responsive to fluid pressure in said fluid operable means for reversing the direction of movement of said fluid operable means, a differential gear mechanism having an input gear, an output gear and a control gear, an input shaft, an output shaft, one of said hydraulic units being drivingly connected to one of said shafts, the other of said hydraulic units being drivingly connected to said control gear, one of said shafts being drivingly connected to one of said input and output gears, the other of said shafts being drivingly connected to the other of said input and output gears, said means for changing the mode of said transmission including first clutch means for selectively connecting one of said shafts to one of said gears, and second clutch means for selectively connecting said input and output gears.

4. A hydrostatic transmission as defined in claim 1, wherein said fluid operable means includes cylinder means, piston means slidable in said cylinder means and defining therein first and second fluid chambers, said shift valve being movable to a first position for porting fluid to said first chamber to move said one hydraulic unit toward said second displacement position and being movable to a second position for porting fluid to said second chamber to move said one hydraulic unit toward said second displacement position, and passage means communicating said first and second chambers respectively with the opposite ends of said shift valve to effect shifting thereof in response to a predetermined pressure rise in said chambers.

5. A hydrostatic transmission as defined in claim 1, including a displacement control valve for porting fluid through said shift valve to said fluid operable means, said displacement control valve porting fluid to said fluid operable means to move said fluid operable means from the first displacement position to said second displacement position to increase the output speed of the transmisssion, said shift valve causing said control valve to port fluid to said fluid operable means to move said fluid operable means from said second position toward said first position to further increase transmission output speed.

6. A differential hydrostatic transmission, comprising: an input shaft, an output shaft, a first hydraulic unit drivingly connected to said input shaft, a second hydraulic unit, conduit means interconnecting said first and second hydraulic units, fluid operable means for varying the displacement of said first hydraulic unit, differential gearing including a first gear driven by said input shaft, a second gear drivingly connected to said output shaft, and a control gear drivingly connected to said second hydraulic unit, means for placing the transmission in either a straight hydrostatic or a differential-hydrostatic mode including first clutch means selectively connecting said input shaft with said first gear and second clutch means selectively connecting said first gear with said second gear, a speed responsive control valve for controlling the fluid operable means, two passage means connecting said control valve with said fluid operable means one of which when pressurized moves the fluid operable means in one direction and the other of which when pressurized moves the fluid operable means in the other direction, and shift valve means for reversing said passage means to cause a reversal in the direction of movement of said fluid operable means thereby changing the mode of the first hydraulic unit with a change in mode of the transmission.

7. A hydrostatic transmission as defined in claim 6, including a forward-reverse valve in said passage means between said control valve and said shift valve for reversing said passages to thereby cause reverse operation of the transmission.

8. A hydrostatic transmission as defined in claim 6, wherein said control valve is movable from a position blocking said passage means to a first postition porting fluid to one of said passage means and a second position porting fluid to the other of said passage means, each of said passage means having respective branch passages connected to the ends of said shift valve to effect shifting thereof in response to a predetermined increase in pressure in said passages, said shift valve being arranged to effect a reversal of said passage means when the fluid operable means reaches a maximum displacement position on one side of neutral, said shift valve also controlling actuation of said first and second clutch means.

9. A differential hydrostatic transmission, comprising: an input shaft, an output shaft, a first hydraulic unit drivingly connected to one of said shafts, a second hydraulic unit, conduit means interconnecting said first and second hydraulic units, differential gearing including first gear means drivingly connected to one of said shafts, second gear means drivingly connected to the other of said shafts, and control gear means drivingly connected to the other of said hydraulic units, means for placing the transmission in two operating modes including clutch means at least selectively connecting one of said shafts and one of said gears, fluid operable means for varying the displacement of one of said hydraulic units, said fluid operable means being movable from a minimum displacement position to a maximum displacement position, said fluid operable means being movable sequentially from one of said positions to the other and from the other to said one position in bringing the transmission up to speed, and shift valve means for actuating said clutch means, said shift valve means being responsive to fluid pressure in said fluid operable means.

10. A hydrostatic transmission as defined in claim 9, including control valve means for controlling the displacement of said one hydraulic unit, said shift valve means effecting simultaneous actuation of said clutch means and a reversal of movement of said fluid operable means in bringing the transmission up to speed.

11. A hydrostatic transmission as defined in claim 9, wherein said clutch means includes a first clutch selectively connecting one of said shafts with one of said gears, a second clutch selectively connecting said first and second gears, and first fluid actuator means for actuating said first clutch means and second fluid actuator means for actuating said second clutch means, said shift valve in a first position pressurizing one of said first and second fluid actuator means and depressurizing the other of said fluid actuator means, and in a second position reversely pressurizing said first and second fluid actuator means, said shift valve being responsive to an increase in pressure in the fluid operable means caused by the latter arriving at one of said positions to reverse the state of actuation of said first and second clutches and to reverse the fluid operable means.

12. A differential hydrostatic transmission, comprising: an input shaft, an output shaft, a first hydraulic unit drivingly connected to one of said shafts, a second hydraulic unit, fluid operable means for varying the displacement of one of said units, conduit means interconnecting said first and second hydraulic units, differential gearing including first gear means drivingly connected to one of said shafts, second gear means drivingly connected to the other of said shafts, and control gear means drivingly connected to the other of said hydraulic units, means for placing the transmission in two operating modes including clutch means at least selectively connecting one of said shafts and one of said gears, said clutch means including a first clutch and a second clutch, first and second fluid actuators for said clutches, control valve means for porting fluid relative to said fluid operable means to control the displacement of said one hydraulic unit, and means for depressurizing said control valve means during movement of said first and second actuators.

13. A hydrostatic transmission as defined in claim 12, wherein said depressurization means includes said first and second fluid actuators, said first and second fluid actuators each having valve means therein for depressurizing said control valve means.

14. A hydrostatic transmission comprising: a first hydraulic unit, a second hydraulic unit, conduit means interconnecting said first and second hydraulic units, fluid operable means for varying the displacement of one of said hydraulic units, said fluid operable means being movable from a zero displacement position to maximum displacement positions on both sides of zero, an engine driven input shaft for the transmission drivingly connected to one of said hydraulic units, an input shaft speed responsive governor valve means for controlling said fluid operable means and means for overriding said governor valve means and moving said fluid operable means to reduce the output of the transmission, said conduit means including first and second conduits for delivering fluid from one unit to another and from the other to said one unit, said overriding means including means for selectively communicating said first and second conduits with said fluid operable means to substantially equalize the pressures in said first and second conduits.

15. A hydrostatic transmission comprising: a first hydraulic unit, a second hydraulic unit, conduit means interconnecting said first and second hydraulic units, fluid operable means for varying the displacement of one of said hydraulic units, said fluid operable means being movable from a zero displacement position to maximum displacement positions on both sides of zero, an engine driven input shaft for the transmission drivingly connected to one of said hydraulic units, an input shaft speed responsive governor valve means for controlling said fluid operable means and means for overriding said governor valve means and moving said fluid operable means to reduce the output of the transmission, said overriding means including means for moving said fluid operable means to reduce the transmission output at input shaft speeds below a predetermined value.

16. A hydrostatic transmission as defined in claim 15, including means for selectively actuating said overriding means at input shaft speeds above said predetermined value.

17. A hydrostatic transmission comprising: a first hydraulic unit, a second hydraulic unit, conduit means interconnecting said first and second hydraulic units, fluid operable means for varying the displacement of one of said hydraulic units, said fluid operable means being movable from a zero displacement position to maximum displacement positions on both sides of zero, an engine driven input shaft for the transmission drivingly connected to one of said hydraulic units, an input shaft speed responsive governor valve means for controlling said fluid operable means and means for overriding said governor valve means and moving said fluid operable means to reduce the output of the transmission, said overriding means including means for moving said fluid operable means to reduce the transmission output at input shaft speeds below a predetermined value, said overriding means including an input shaft driven neutral governor, and a pressure control valve movable from a first position blocking communication between said conduit means and said fluid operable means and a second position providing communication therebetween, said neutral governor moving said pressure control valve to said second position at input shaft speeds below said predetermined value and moving said pressure valve to said first position at speeds above said predetermined value, whereby movement of said fluid operable means from the zero displacement position in one direction at speeds below the predetermined speed will cause flow in said conduit means to be conveyed to the fluid operable means in a direction to return the fluid operable means toward zero.

18. A hydrostatic transmission, comprising: a first hydraulic unit, a second hydraulic unit, conduit means interconnecting said first and second hydraulic units, fluid operable means for varying the displacement of one of said hydraulic units, said fluid operable means being movable from zero displacement to increase transmission speed, input shaft means connected to drive one of said hydraulic units, control means for normally controlling said fluid operable means, and input shaft speed responsive means separate from said normal control for preventing movement of said fluid operable means from zero at speeds below a predetermined value.

19. A hydrostatic transmission as defined in claim 18, wherein said means for preventing movement includes means for conveying fluid from said conduit means in a direction to immediately return said fluid operable means to zero displacement.

20. A differential hydrostatic transmission, comprising: an input shaft, an output shaft, a first hydraulic unit drivingly connected to one of said shafts, a second hydraulic unit, fluid operable means movable from a zero displacement position for varying the displacement of one of said units, conduit means interconnecting said first and second hydraulic units, differential gearing including first gear means drivingly connected to one of said shafts, second gear means drivingly connected to the other of said shafts, and control gear means drivingly connected to the other of said hydraulic units, means for placing the transmission in two operating modes including clutch means at least selectively connecting one of said shafts and one of said gears, governor valve means responsive to the speed of one of said shafts for porting fluid to said fluid operable means to control the displacement of said one hydraulic unit, a forward-reverse valve between said governor valve means and said fluid operable means for controlling the initial direction of movement of said fluid operable means from zero displacement, a shift valve between said forward-reverse valve and said fluid operable means for simulataneously controlling said clutch means and reversing said fluid operable means when the fluid operable means reaches its maximum displacement position to thereby change the operating mode of the transmission, and neutral governor means for moving said fluid operable means to zero displacement at speeds of said one shaft below a perdetermined value.

21. A hydrostatic transmission as defined in claim 20, including a third hydraulic unit, a fourth hydraulic unit, conduit means interconnecting said third and fourth hydraulic units, fluid operable means for varying the displacement of one of said third or fourth hydraulic units, one of said shafts being drivingly connected to said third hydraulic unit, said control gear being drivingly connected to said fourth hydraulic unit, said governor valve means being connected to simultaneously control both of said fluid operable means, said shift valve means being arranged to simultaneously reverse both of said fluid operable means.

22. A hydrostatic transmission, comprising: a first hydraulic unit, a second hydraulic unit, first and second conduit means interconnecting said first and second hydraulic units for delivering fluid therebetween, fluid operable means for varying the displacement of one of said hydraulic units, said fluid operable means being movable from a zero displacement position to maximum displacement positions on both sides of zero, an engine driven input shaft for the transmission drivingly connected to one of said hydraulic units, an input shaft speed responsive governor valve means for controlling said fluid operable means, and means for overriding said governor valve means on decreasing input shaft speed and maintaining substantially constant pressure in said first and second conduits.

23. A hydrostatic transmission, comprising: a first hydraulic unit, a second hydraulic unit, first and second conduit means interconnecting said first and second hydraulic units, fluid operable means for varying the displacement of at least one of said hydraulic units, said fluid operable means being movable from a zero displacement position to maximum displacement positions on both sides of zero, means normally controlling said fluid operable means for varying the transmission ratio, and means for overriding said normal control means and moving said fluid operable means to reduce the output of the transmission including means for selectively communicating said first and second conduits with said fluid operable means to substantially equalize the pressure in said first and second conduits.

References Cited

UNITED STATES PATENTS

| | | | |
|---|---|---|---|
| 2,939,342 | 6/1960 | Woydt et al. | 74—687 |
| 3,122,025 | 2/1964 | Mark et al. | 74—687 X |
| 3,139,723 | 7/1964 | Hollowell | 60—19 |
| 3,187,509 | 6/1965 | Moon | 60—53 |
| 3,236,049 | 2/1966 | Reinke | 60—53 |
| 3,274,855 | 9/1966 | Reynolds et al. | 74—687 |

FOREIGN PATENTS

| | | |
|---|---|---|
| 779,903 | 7/1957 | Great Britain. |

ARTHUR T. McKEON, *Primary Examiner.*

U.S. Cl X.R.

60—19, 53; 74—868